Figure 1:
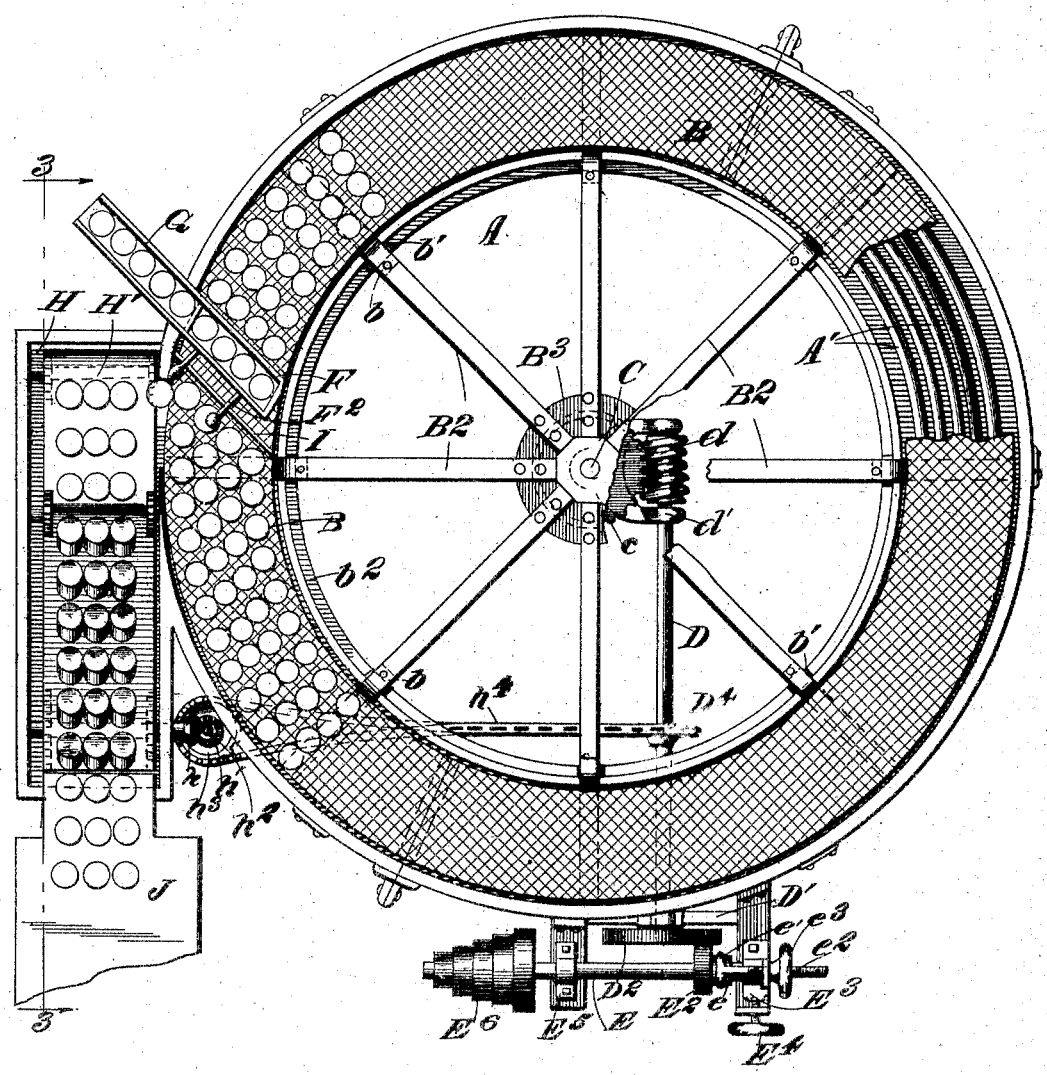

No. 777,321. PATENTED DEC. 13, 1904.
O. E. VANCE & P. S. & N. G. BAKER.
CAN COOKING MACHINE.
APPLICATION FILED NOV. 27, 1903.
NO MODEL. 3 SHEETS—SHEET 1.

WITNESSES
INVENTORS.

No. 777,321. PATENTED DEC. 13, 1904.
O. E. VANCE & P. S. & N. G. BAKER.
CAN COOKING MACHINE.
APPLICATION FILED NOV. 27, 1903.
NO MODEL. 3 SHEETS—SHEET 2.
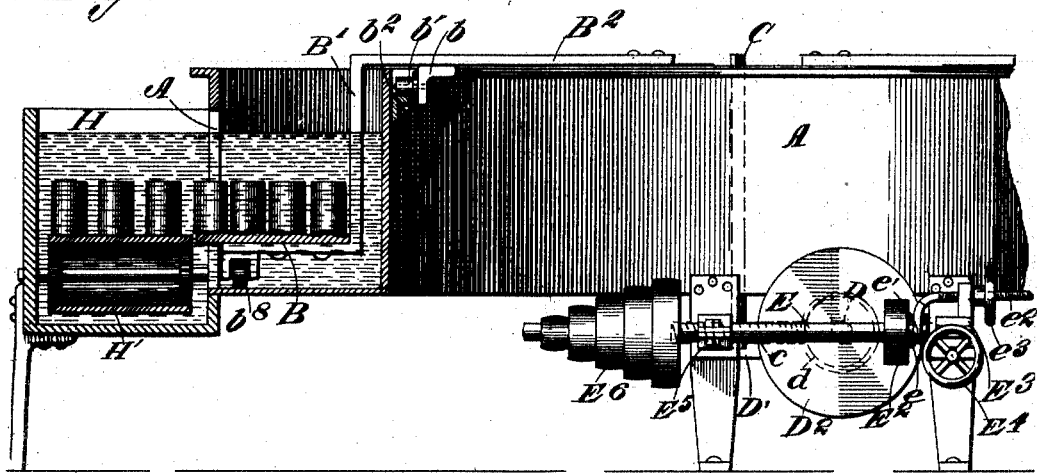
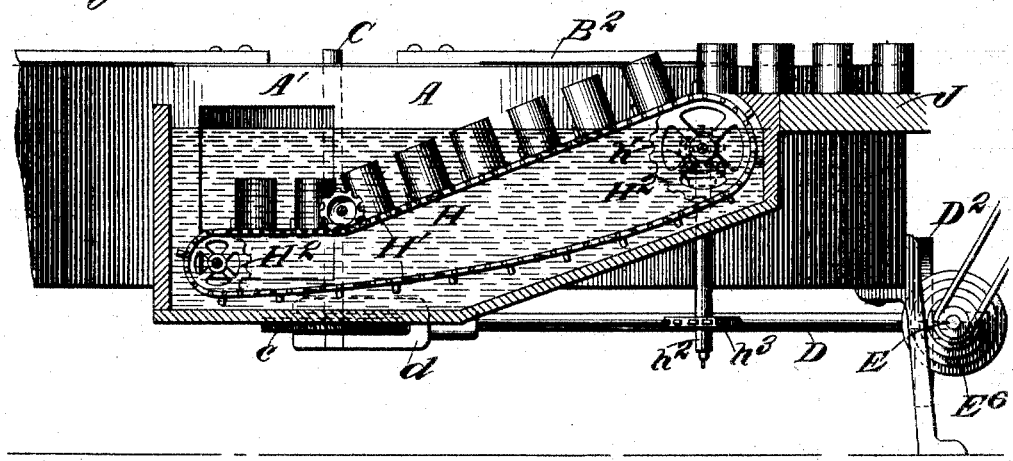

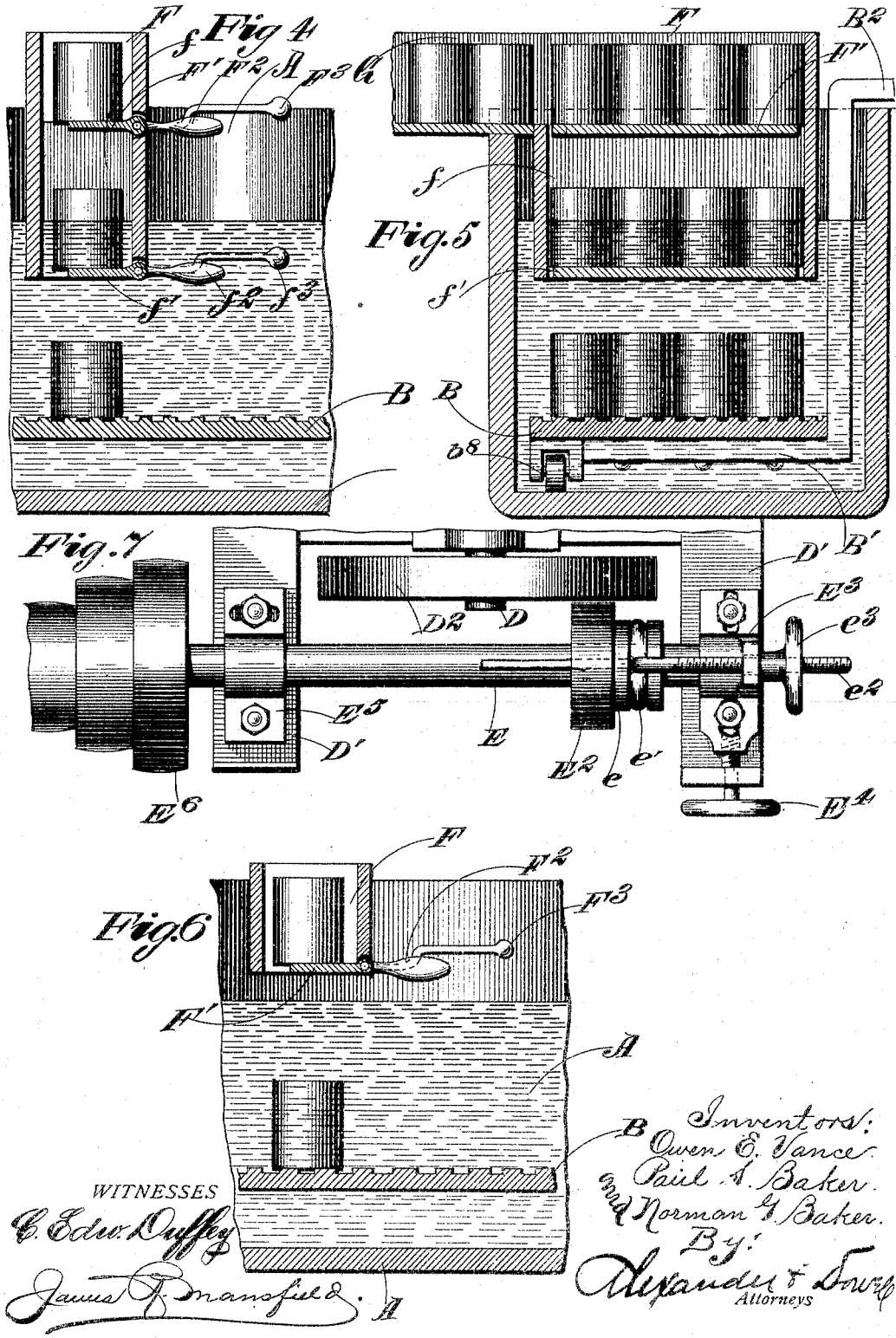

No. 777,321. Patented December 13, 1904.

UNITED STATES PATENT OFFICE.

OWEN E. VANCE, PAUL S. BAKER, AND NORMAN G. BAKER, OF MUSCATINE, IOWA; SAID VANCE AND PAUL S. BAKER ASSIGNORS TO SAID NORMAN G. BAKER.

CAN-COOKING MACHINE.

SPECIFICATION forming part of Letters Patent No. 777,321, dated December 13, 1904.

Application filed November 27, 1903. Serial No. 182,802. (No model.)

*To all whom it may concern:*

Be it known that we, OWEN E. VANCE, PAUL S. BAKER, and NORMAN G. BAKER, all of Muscatine, Muscatine county, State of Iowa, have invented certain new and useful Improvements in Can-Cooking Machines; and we hereby declare that the following is a full, clear, and exact description thereof, reference being had to the accompanying drawings, which form part of this specification.

This invention is an improvement in machines for cooking or sterilizing canned goods, such as fruits and vegetables; and its object is to make a machine of great capacity, very simple in construction, and easily operated, and which can be used as a sterilizer or exhauster as well as a cooker, the temperature being easily regulated at the will of the operator.

The machine in brief comprises a large tank provided with a movable carrier, upon which the cans or packages to be treated are placed, also means for semi-automatically feeding the cans to the machine and means for removing them automatically therefrom after they have made a complete circuit therethrough. The machine does not shake nor upset the cans or packages, but carries them steadily and smoothly from the feed to the delivery and at any desired speed, so that the goods may be subjected to any desired temperature for any desired length of time in traveling through the machine.

The invention is summarized in the claims following the description of the machine illustrated in the accompanying drawings, which shows what we think the best embodiment of the invention now known to us and which we will proceed to describe with reference to said drawings, although we do not limit ourselves to the specific form, proportions, or constructions of parts shown therein.

In the drawings, Figure 1 is a top plan view of the complete machine with the top removed. Fig. 2 is a sectional side elevation thereof. Fig. 3 is a detail vertical section on line 3 3, Fig. 1, with the top removed. Figs. 4, 5, and 6 are detail views of the feeding devices. Fig. 7 is an enlarged plan view of the frictional driving mechanism.

A designates an annular tank, preferably of large diameter, capable of containing a large number of cans. This tank is adapted to hold water and may be heated by means of steam-coils $A'$ in its bottom or in any other desired way, so that the water therein can be kept at any desired temperature for sterilizing or cooking purposes. Within the tank is an annular carrier or platform B, which is supported by hangers $B'$ from radial arms $B^2$, attached to a hub $B^3$ on the upper end of a vertical shaft C, the lower end of which may be stepped in a suitable boxing, said shaft C being at the center of the tank and arranged in the axial line thereof. The arms $B^2$ are provided near the tank with brackets $b$, carrying rollers $b'$, which run upon an annular track $b^2$, attached to the inner side of the tank, as shown, thus supporting the arms $B^2$ on the tank and suspending the carrier freely in the tank a few inches above the bottom thereof. Preferably the surface of this carrier is rough, as indicated in the drawings, to prevent the cans slipping thereon. The outer edge of the carrier may be supported on rollers $b^8$, as indicated in the drawings.

The shaft C has a worm-gear $c$ on its lower end, which meshes with a worm $d$ on the inner end of shaft D, which is supported in suitable bearings in a casting $d'$ at its inner end and a framing $D'$ at its outer end. On the outer end of shaft D is a friction-disk $D^2$, which is adapted to be driven by a friction-pulley $E^2$, splined on a cross-shaft E, journaled in the frame D, said friction-pulley having a grooved collar $e$, engaged by a yoke $e'$, attached to a threaded rod $e^2$, extending through a guide-opening in the adjacent journal-box $E^3$ of shaft E, and by means of a hand-nut $e^3$ on rod $e^2$ the pulley $E^2$ can be shifted on shaft E so as to vary its point of contact with disk $D^2$. The box $E^3$ can be adjusted laterally by means of a hand-screw $E^4$, so as to move pulley $E^2$ into or out of contact with disk $D^2$, the other journal-box, $E^5$, of shaft E being pivoted to permit the necessary lateral swing of said shaft for this purpose.

The shaft E may be driven by means of a stepped cone-pulley $E^6$ on its outer end, as shown, from any suitable source of power. The driving means shown admits of a large variation in the speed of the carrier, and by properly adjusting the drive any desired length of time can be taken for one revolution of carrier B, so that the cans or goods placed thereon will be completely sterilized, exhausted, or cooked by the time the carrier has made one complete revolution, during which time the cans will be brought from the feed to the delivery. We do not, however, restrict ourselves to keeping the cans in the machine for an entire revolution of the carrier, for by increasing the number of points of feed and delivery the cans could be treated in less than a revolution of said carrier.

The cans are fed into the machine from a box F, (see Fig. 6,) which extends across the tank, preferably at a tangent and parallel with the ejecting deflector-bar I, hereinafter referred to. This box F is long enough to contain several cans in line and is provided with a hinged bottom F', which is normally closed by a weighted arm $F^2$, which will sustain the weight of a row of cans in the box. When the box is filled, the operator tips the bottom by means of a handle $F^3$ or other suitable device, so that the row of cans drops simultaneously into the tank B. Then the bottom closes automatically, and the box is filled with other cans to be treated. These cans may be conveniently fed into the box from a chute G, as indicated in the drawings; but we do not restrict ourselves to any particular can-supplying device. As indicated in Fig. 6, the cans are dropped directly onto the carrier B. This is the method used in a cooking-machine; but in a sterilizing or exhausting machine we consider it preferable to introduce the cans gradually into the water. For this purpose, as indicated in Figs. 4 and 5, a second box $f$ is arranged beneath the box F and provided with a hinged bottom $f'$, weight $f^2$, and trip-handle $f^3$, and the cans are dropped from box F into box $f$, where they remain partly submerged until box F has been filled. Then cans in box $f$ are dropped onto the carrier and the cans in box F into box $f$. Thus the cans are partly sterilized or exhausted before being completely submerged. The cans are carried around by carrier B until they strike the deflector-bar I, by which they are directed laterally out of the tank through an opening A' in the side thereof into a trough H, in which is an endless conveyer H', running over drums or sprockets $H^2$, located at the upper and lower ends of the trough, said conveyer carrying the cooked cans up to and discharging them upon a table J, from which they can be removed. The conveyer H' may be driven by means of a bevel-gear $h$ on the shaft of the upper drum $H^2$ meshing with a bevel $h'$ on the upper end of a shaft $h^2$, suitably journaled in the frame and having a sprocket $h^3$ on its lower end driven by a chain $h^4$ from a sprocket $D^4$ on shaft D. (See Fig. 1.)

In practice two machines may be used side by side, one for exhausting, the other for cooking. The exhausting-machine would have the double feed shown in Figs. 4 and 5, while the cooker would have the single feed shown in Fig. 7. The cans after passing through the exhauster could be inverted and placed in the cooker and subjected to the proper temperature for thoroughly cooking their contents.

It will be observed that these machines can be built of great capacity. The wider the tank the more cans can be placed therein. As the carrier moves continuously, there will be enough clear space provided beneath the feed-box to receive the cans discharged therefrom by the time the operator has filled the box and is ready to empty it. The weight of the carrier and cans thereon is transferred to the track $b^2$ through rollers $b'$, so that small power is required to operate the machine, and the inclination of bar I is such that the cans will naturally slide out into trough H and not crowd back upon the following cans.

Having thus described our invention, what we therefore claim as new, and desire to secure by Letters Patent thereon, is—

1. The combination of a tank, a movable carrier therein, a plurality of feed-boxes in the tank, arranged one above the other, and means whereby the contents of an upper box can be discharged into an underlying box, and the contents of the lowest box discharged onto the carrier, substantially as described.

2. The combination of an annular tank, a movable carrier or platform therein, a plurality of feed-boxes in and extending across the tank, and arranged one above the other, said boxes having movable bottoms, whereby the contents of the upper box can be discharged into the underlying box, and the contents of the lowest box discharged onto the carrier, substantially as described.

3. The combination of an annular tank, an annular carrier therein, a plurality of superimposed feed-boxes, extending across the tank, having movable bottoms, and a fixed tangentially-arranged discharging-bar extending across the tank beside the feed-boxes, adapted to direct cans out of the tank, substantially as described.

4. The combination of an annular tank, an annular platform or carrier therein, an axial shaft, arms connected to said shaft and extending over the tank, means for suspending said carrier from said arms, rollers supporting said arms, means for rotating said shaft, a trough beside the tank, a fixed inclined bar in the tank, for discharging the cans into the trough, and a feed-box having a hinged bottom, adapted to drop cans into the tank.

5. In combination, an annular tank, an annular carrier therein, a vertical axially-disposed shaft, arms radiating therefrom extending over the tank, connections between said arms and carrier, a counter-shaft and worm-gearing for driving the vertical shaft, and adjustable frictional gearing for driving said counter-shaft; a trough beside the tank communicating therewith, means in the tank for discharging the cans into the trough, means for feeding cans into the tank, and means for removing cans from the trough, substantially as described.

6. In combination, an annular tank, an annular carrier therein, a vertical axially-disposed shaft, arms radiating therefrom extending over the tank, means for suspending said carrier from said arms, friction-rollers on said arms, a track on the tank supporting said arms, a counter-shaft and gearing for driving the vertical shaft, and adjustable frictional gearing for driving said counter-shaft, a trough beside the tank communicating therewith, a tangentially-arranged bar in the tank for discharging the cans into the trough, means for dropping cans into the tank, and an endless conveyer for removing cans from the trough, substantially as described.

7. In a sterilizing and cooking machine, the combination of an annular tank, an annular movable platform or carrier therein, an axial shaft, arms radiating therefrom, said carrier being suspended from said arms, means for rotating said shaft, means for feeding cans onto the carrier, and means for discharging cans therefrom.

8. In a sterilizing and cooking machine, the combination of a tank, a rotatable annular platform or carrier therein, a feed-box in the tank above the carrier, and means for dropping the contents of the box onto the carrier in the tank, substantially as described.

9. In a sterilizing and cooking machine, an annular tank, an annular rotatable carrier therein, a feed-box extending across the tank above the carrier having a movable bottom, and means for opening this bottom so as to drop the contents of the box directly onto the carrier in the tank, substantially as described.

10. The combination of a tank, a movable carrier therein, and a tangentially-arranged discharge-bar above extending across the path of the carrier, and adapted to cause the cans moved thereagainst by the carrier to pass out at the side of the tank.

11. The combination of an annular tank, an annular rotatable carrier therein, means for feeding cans onto the carrier, and a tangentially-arranged discharge-bar above and extending across the carrier and adapted to cause the latter to pass out at the side of the tank as the carrier moves under the bar, substantially as described.

12. The combination of a tank, a carrier therein, a feed-box extending across the tank above the carrier, having a movable bottom adapted to drop cans onto the carrier, and a fixed discharge-bar extending tangentially across the tank beside the feed-box and adapted to cause the cans to move off the carrier and out of the tank, substantially as described.

13. The combination of a tank, a rotatable carrier therein, means for rotating said carrier, a trough beside the tank and communicating therewith at one side, means for discharging the cans laterally from the tank and carrier into the trough, means for dropping cans into the tank and onto the carrier, and a conveyer in the trough for removing cans therefrom, substantially as and for the purpose described.

14. In combination a tank, a movable carrier therein, a trough beside the tank communicating therewith at one side, a tangentially-arranged discharge-bar in the tank adapted to direct cans out of the tank into the trough, and an endless carrier in the trough for removing the cans therefrom, all substantially as and for the purpose described.

15. In combination an annular tank, a movable rotatable carrier therein, a trough beside the tank communicating therewith through an opening in the side of the tank, and a conveyer for removing cans from the trough; with a tangentially-inclined discharge-bar in the tank adapted to direct cans out of the tank into the trough and onto the conveyer therein, and means for dropping cans onto the carrier beside said bar, substantially as described.

16. In combination an annular tank, an annular carrier therein, a vertical shaft, arms radiating therefrom extending over the tank, and connections between said arms and carrier; with a counter-shaft, worm-gearing between said counter-shaft and the vertical shaft, and adjustable frictional gearing for driving said counter-shaft, all substantially as described.

In testimony that we claim the foregoing as our own we affix our signatures in presence of two witnesses.

OWEN E. VANCE.
PAUL S. BAKER.
NORMAN G. BAKER.

In presence of—
E. D. LOCKWOOD,
J. H. ASHBAUGH.